(12) United States Patent
Elstorpff et al.

(10) Patent No.: US 12,203,514 B2
(45) Date of Patent: Jan. 21, 2025

(54) PRESSURE-MEDIUM-ACTUATED BRAKE CYLINDER OF A RAIL VEHICLE

(71) Applicant: KNORR-BREMSE Systeme für Schienenfahrzeuge GmbH, Munich (DE)

(72) Inventors: Marc-Gregory Elstorpff, Munich (DE); Balazs Varga, Budaörs (HU); Zoltan Koos, Budapest (HU)

(73) Assignee: KNORR-BREMSE Systeme für Schienenfahrzeuge GmbH (DE)

(*) Notice: Subject to any disclaimer, the term of this patent is extended or adjusted under 35 U.S.C. 154(b) by 348 days.

(21) Appl. No.: 17/737,417

(22) Filed: May 5, 2022

(65) Prior Publication Data

US 2022/0356918 A1 Nov. 10, 2022

(30) Foreign Application Priority Data

May 5, 2021 (DE) .......................... 102021111613.9

(51) Int. Cl.
*F16D 55/224* (2006.01)
*F16D 65/18* (2006.01)
(Continued)

(52) U.S. Cl.
CPC ......... *F16D 55/2245* (2013.01); *F16D 65/18* (2013.01); *F16D 2125/04* (2013.01); *F16D 2125/08* (2013.01)

(58) Field of Classification Search
CPC .. F16D 55/2245; F16D 65/18; F16D 2125/08; F16D 65/183; F16D 2125/04;
(Continued)

(56) References Cited

U.S. PATENT DOCUMENTS

| 5,897,119 A | 4/1999 | McMillen |
| 8,789,664 B2 * | 7/2014 | Fantazi ................. B60T 17/083 188/170 |

(Continued)

FOREIGN PATENT DOCUMENTS

| DE | 19728605 A1 | 2/1999 |
| DE | 102013000514 A1 | 7/2014 |

(Continued)

OTHER PUBLICATIONS

German Patent No. DE 19636203 to Fenn published on Nov. 13, 1997.*

(Continued)

*Primary Examiner* — Pamela Rodriguez
(74) *Attorney, Agent, or Firm* — Barnes & Thornburg LLP (57) ABSTRACT

A pressure-medium-actuated brake cylinder of a rail vehicle has a housing, a translationally movable brake piston rod extending through a bore in a housing base, a guide ring which is received in the bore, encloses the brake piston rod and is intended for guiding the brake piston rod in the bore, and at least one sealing ring which is received in the bore, encloses the brake piston rod and is intended for sealing an interior of the housing with respect to a space outside the housing, wherein the guide ring and the at least one sealing ring are designed as a guide and sealing ring combined to form a structural unit.

14 Claims, 6 Drawing Sheets

(51) Int. Cl.
*F16D 125/04* (2012.01)
*F16D 125/08* (2012.01)

(58) Field of Classification Search
CPC ........ B60T 17/00; F16J 15/56; F16J 15/3232; F16J 15/3252; F16C 2326/10
See application file for complete search history.

(56) References Cited

U.S. PATENT DOCUMENTS 8,925,698 B2 * 1/2015 Herges .................... F16D 65/28
188/170
2020/0040955 A1 2/2020 Darner

FOREIGN PATENT DOCUMENTS

DE 102013109374 A1 3/2015
DE 102018104123 B3 2/2019

OTHER PUBLICATIONS

German Patent No. DE 102006005031 to Le Mer published on Aug. 9, 2007.*
Chinese Patent No. CN 116592074 to Weng et al published on Aug. 15, 2023.*
Translation of German Patent No. DE 102013109374 obtained from website: https://worldwide.espacenet.com on Jun. 11, 2024.*

* cited by examiner

PRESSURE-MEDIUM-ACTUATED BRAKE CYLINDER OF A RAIL VEHICLE

CROSS REFERENCE AND PRIORITY CLAIM

This application claims the benefit of priority of German Application No. 102021111613.9, filed May 5, 2021, the entire contents of which are incorporated herein by reference.

FIELD

Disclosed embodiments relate to a pressure-medium-actuated brake cylinder of a rail vehicle.

BACKGROUND

Such pressure-medium-actuated brake cylinders are used, for example, as a parking brake cylinder in rail vehicles.

In order to seal a brake piston rod of the brake cylinder that is guided through a bore in a housing base of a housing of the brake cylinder and is able to move translationally in the axial direction of the brake piston rod, use is customarily made of shaft sealing rings which seal a region of an interior of the housing with respect to a space outside the housing.

Furthermore, it is important to guide the brake piston rod exactly coaxially to the sealing ring to ensure this sealing ring. It is important here that the mounting of the brake piston rod has only such a degree of play that the sealing lip of the sealing ring can follow this radial movement of the brake piston rod without the sealing lip being released from the lateral surface of the brake piston rod. For exact guidance of such a brake piston rod, it is therefore known, in addition to the sealing rings, also to arrange a guide ring in the region of the bore of the housing that slides on the brake piston rod.

SUMMARY

Disclosed embodiments provide a pressure-medium-actuated brake cylinder of a rail vehicle in such a way as to provide cost-effective sealing and guiding of the brake piston rod.

BRIEF DESCRIPTION OF FIGURES

Various embodiments are explained in more detail below with reference to the appended drawings, in which.

DETAILED DESCRIPTION

In accordance with the disclosed embodiments, the pressure-medium-actuated brake cylinder of a rail vehicle has a housing, a translationally movable brake piston rod extending through a bore in a housing base, a guide ring which is received in the bore, encloses the brake piston rod and is intended for guiding the brake piston rod in the bore, and at least one sealing ring which is received in the bore, encloses the brake piston rod and is intended for sealing an interior of the housing with respect to a space outside the housing.

Here, the guide ring and the at least one sealing ring are designed as a guide and sealing ring combined to form a structural unit.

A guide and sealing ring designed in such a way ensures reliable guiding and sealing of the bore of the housing through which the brake piston rod is guided while at the same time being simple to mount.

According to an embodiment variant, the guide and sealing ring has centrally a guide region which is adjoined on both sides by sealing regions as viewed in the axial direction of the brake piston rod.

By virtue of the centrally arranged guide region there is achieved reliable sealing particularly as a result of the fact that the sealing regions arranged adjacent to the guide region have to compensate for only a very small degree of play and are therefore always reliably in contact with the lateral surface of the brake piston rod.

According to an embodiment variant, each of the sealing rings has a sealing lip bearing against a lateral surface of the brake piston rod.

According to an embodiment variant, a spring element, in particular a tension spring, is arranged on a side of each of the sealing regions that faces away from the lateral surface of the brake piston rod.

An additional pressing of the sealing regions, in particular of the sealing lip, onto the lateral surface of the brake piston rod is thereby ensured in a simple manner.

According to an embodiment variant, the sealing lip is produced from an acrylonitrile-butadiene rubber elastomer having a glass transition temperature of below −60° C.

This allows airtightness down to a temperature of −50° C. and thus also allows the use of such a brake cylinder at extremely low temperatures.

According to an embodiment variant, the guide region of the guide and sealing ring has a metal insert.

According to an embodiment variant, this metal insert is enclosed by the material of the sealing lip on at least three sides and is consequently held in the guide and sealing ring in a reliable manner.

According to an embodiment variant, the metal insert has, on its side facing the brake piston rod, a groove in which a guide strip made of a low-friction material is inserted.

This makes it possible to dispense with additional lubricants for the translational movement of the brake piston rod relative to the guide and sealing ring.

According to an embodiment variant, the guide strip here consists of a polytetrafluoroethylene (PTFE) having a carbon content of 20% to 30%, particularly optionally of approximately 25%.

Such a material mixture has proved itself in experiments to be of high quality in terms of guidance and friction and with regard to wear.

The metal insert may optionally be produced from steel.

The metal insert may optionally be designed as a ring which completely encloses the guide strip radially from the outside.

The guide strip itself may optionally be also in the form of a ring, optionally in the form of an open ring having at least one cutout, which not only facilitates mounting of the guide strip in the metal insert but also thereby provides a collecting groove for abrasion of the guide strip.

According to an alternative embodiment variant, the metal insert may be completely enclosed by the material of the sealing lip. In this embodiment variant, the material of the sealing lip that may be arranged radially on the inside in front of the metal insert having peripheral lubricant grooves. The orientation of the lubricant grooves in the circumferential direction avoids the sealing lip being lifted off due to compression of the relatively soft material of the sealing lip in the direction of the sealing lips.

According to a further alternative embodiment variant in which the metal insert is formed from bearing bronze, an inner surface of this metal insert produced from bearing bronze bears against the brake piston rod. Here too, in an optional embodiment variant, the bearing surface of the metal insert is formed with peripheral lubricant grooves.

In the following description of the figures, terms such as upper, lower, left, right, front, rear, etc. refer exclusively to the exemplary illustration and position, chosen in the respective figures, of the brake cylinder, housing, guide and sealing ring, sealing lip, metal insert, guide strip and the like. These terms are not to be understood as limiting, that is to say that these references may change as a result of different operating positions or the mirror-symmetrical design or the like.

Figure 1:
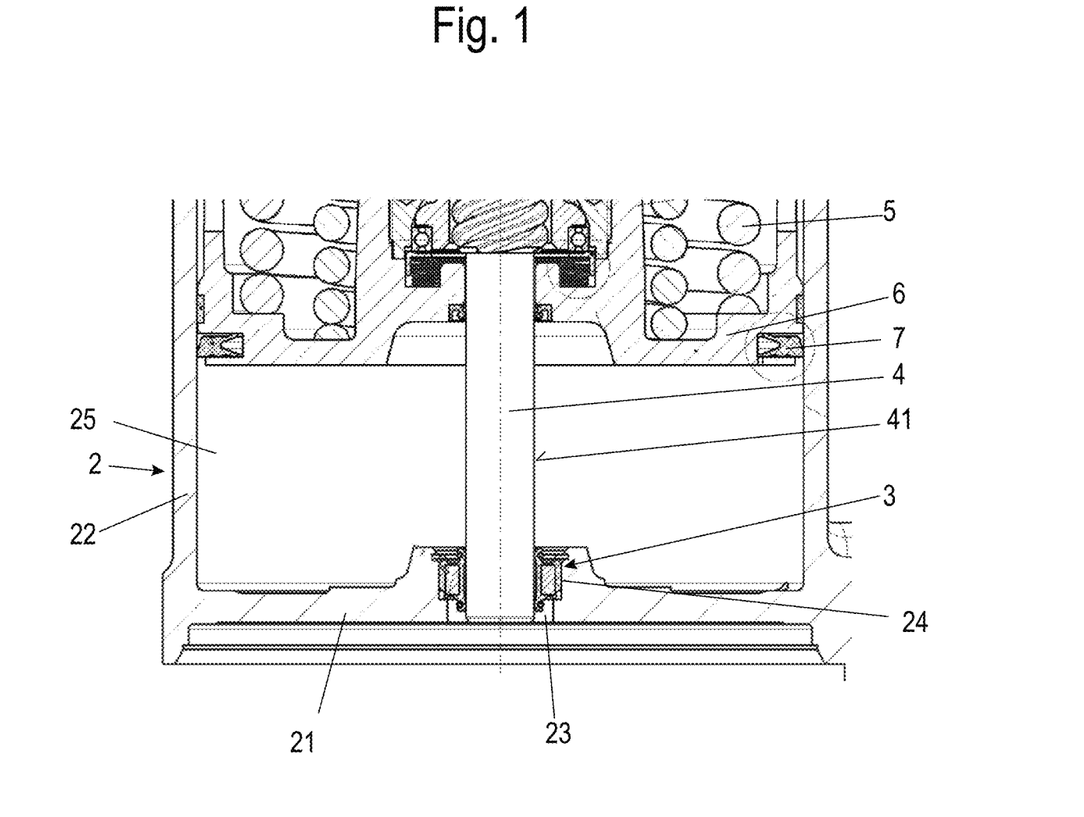
FIG. 1 shows a sectional illustration through a subregion of an embodiment variant of a brake cylinder having a guide and sealing ring which is arranged in a bore of the housing and which encloses a brake piston rod.

In FIG. 1, the reference sign 2 designates a housing of an embodiment variant of a brake cylinder according to the invention, for example a parking brake cylinder.

In an interior 25 of the housing 2, which is delimited by a cylinder wall 22 and a housing base 21 and also here, by way of example, by a spring brake piston 6, there is centrally arranged a brake piston rod 4 which is received in a bore 23 in the housing base 21 on the side of the housing 2 that faces away from the spring brake piston 6.

On the side of the spring brake piston 6 that faces away from the interior 25 there is illustrated a spring 5 by which the spring brake piston 6 can be pressed in the direction of the base 29. In the case of the brake cylinder being used in a parking brake unit, the spring brake piston 6, and with it the brake piston rod 4, is pressed from a braking position back into a release position when the interior 25 is supplied with compressed air.

In order to seal this spring brake piston 6 with respect to the interior 25 of the housing 2, a sealing ring 7 is arranged radially on the outside of the spring brake piston 6.

As can further be seen in FIG. 1, a recess 24, in which a guide and sealing ring 3 is arranged, is provided in the bore 23 in the housing base 21.

Figure 2:
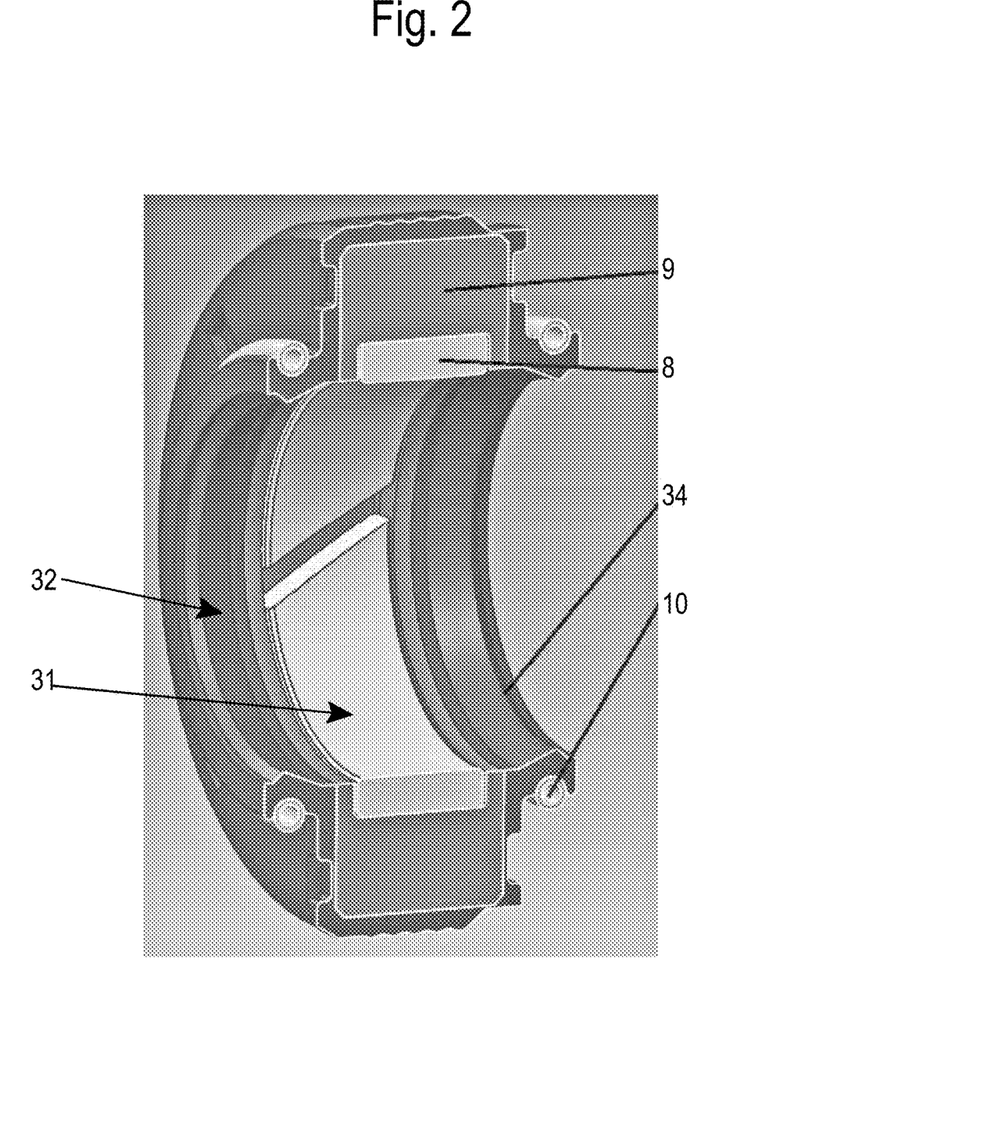
FIG. 2 shows a plan view of a cut-away guide and sealing ring according to an embodiment variant.
Figure 3:
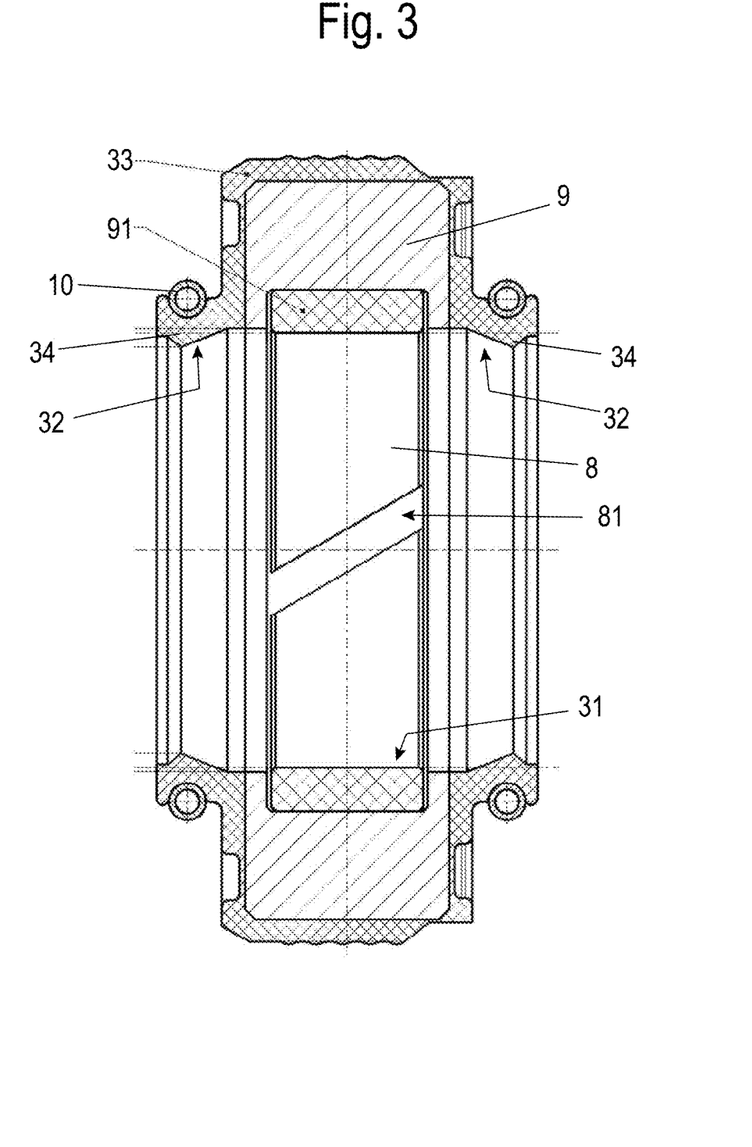
FIG. 3 shows a sectional view of the guide or sealing ring according to FIG. 2

FIGS. 2 and 3 illustrate a first embodiment variant of such a guide and sealing ring 3 which, on the one hand, can be used to seal the interior 25 with respect to the exterior beyond the housing base 21 and at the same time serves for radially guiding the brake piston rod 4.

As shown in FIGS. 2 and 3, this guide and sealing ring 3, which is combined to form a structural unit, has centrally a guide region 31 which is adjoined on both sides by sealing regions 32 as viewed in the axial direction of the brake piston rod 4.

Figure 4:
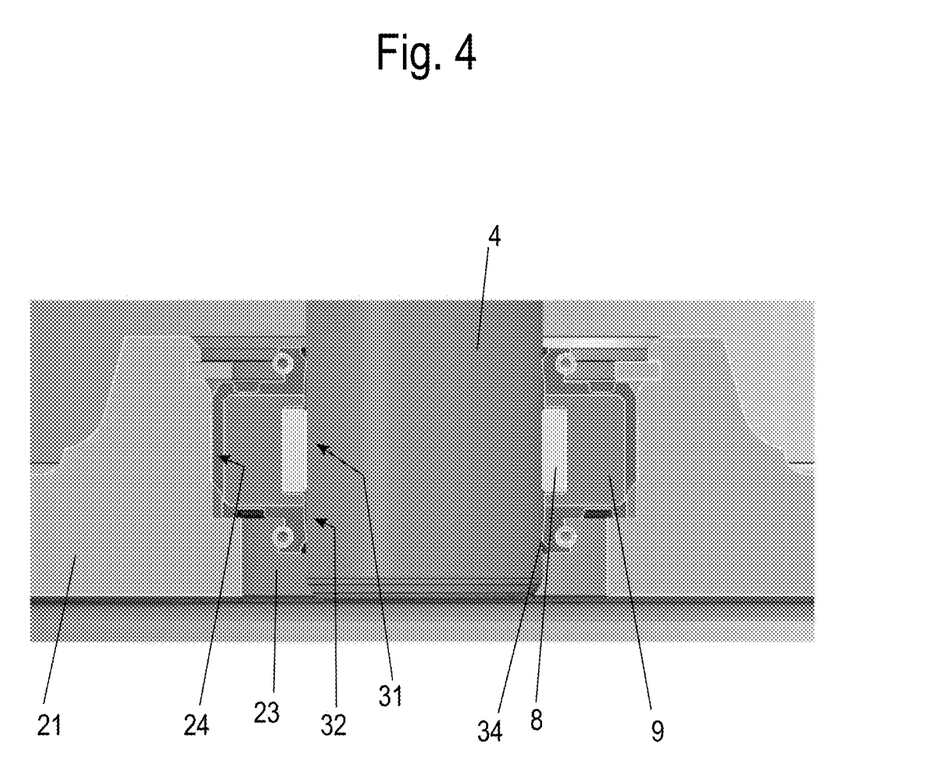
FIG. 4 shows a further sectional illustration of the guide or sealing ring according to FIG. 3 with brake piston rod received therein.

Here, each of these sealing regions 32 has a sealing lip 34 which bears against a lateral surface 41 of the brake piston rod 4, as is illustrated by way of example in FIG. 4.

In order for the sealing lip 34 always to be pressed onto the lateral surface 41 of the brake piston rod 4, in the embodiment variant shown here a spring element, in particular in the form of a tension spring 10, is arranged on a side of each of the sealing regions 32 that faces away from the lateral surface 41 of the brake piston rod 4.

The tension spring 10 encloses a cylindrical outer wall of the sealing region 32, with the tension spring 10 being under preloading in the state in which it is placed on the sealing region 32, and thus pressing the sealing lip 34 against the lateral surface 41 of the brake piston rod 4.

The sealing lip 34 may be formed in terms of its shape in such a way that, as can clearly be seen in FIGS. 2 and 3, it tapers axially outward starting from the guide region 31 with a smaller gradient towards the brake piston rod 4 than on the side of the sealing lip 34 that faces away from the guide region 31.

In each of the embodiment variants shown in FIGS. 2 to 5, the guide region 31 of the guide and sealing ring 3 has a metal insert 9, 11, 12.

Figure 5:
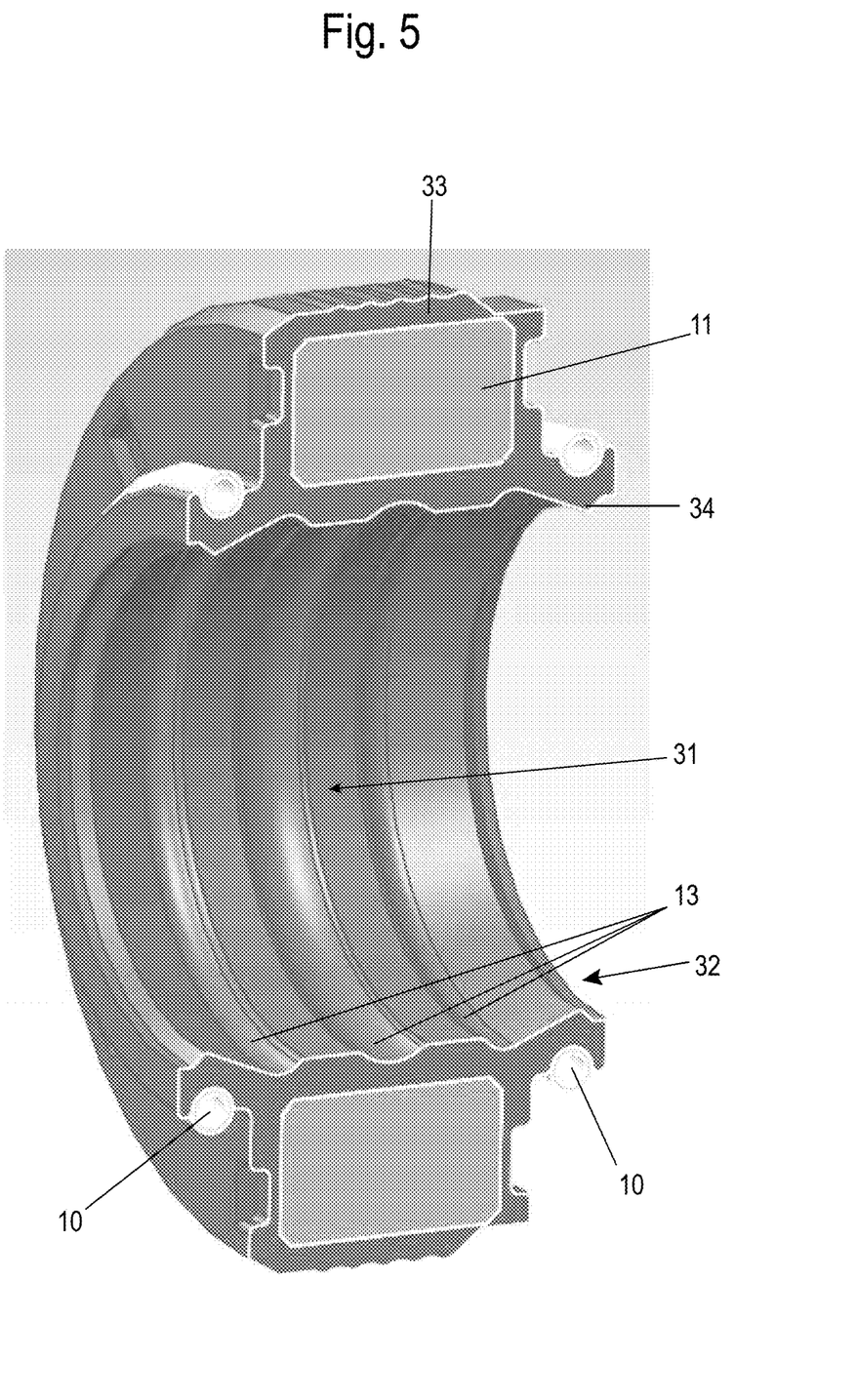
FIG. 5 shows a view corresponding to FIG. 2 of an alternative embodiment variant of a guide and sealing ring.

In the embodiment variants shown in FIGS. 2 to 3 and 5, the metal insert 9, 12 is enclosed on three sides by the material of the sealing lip 34.

The material of the sealing lip 34 extends here from the actual sealing region 32 with the sealing lip 34 radially outward in an approximately pocket-shaped manner and thus encloses the metal insert 9, 12.

In the central guide region 31 of the guide and sealing ring 3, the metal insert 9 has, in the embodiment variant shown in FIGS. 2 and 3, on its side facing the brake piston rod 4, a groove 91 in which a guide strip 8 made of a low-friction material is inserted.

A suitable low-friction material here is in particular a polytetrafluoroethylene (PTFE) having a carbon content of 20% to 30%, in particular of approximately 25%. Other low-friction materials are also conceivable.

The metal insert 9 is optionally produced from a steel and thus ensures, together with the guide strip 8, reliable radial guiding of the brake piston rod 4.

The sealing lip 34 and the sealing region 32 adjoining the latter optionally consist of an acrylonitrile-butadiene rubber (NBR) elastomer, optionally of a low-temperature-resistant NBR 80 elastomer, which is distinguished by a glass transition temperature of below −60° C. and thus ensures an airtightness down to a temperature of −50° C.

The guide strip 8 is here optionally configured as a ring which is open on a portion, with the incision 81 in the guide strip 8 being configured at an angle, optionally at a cut angle of approximately 30°, when viewed in a direction axially to the brake piston rod 4.

In the embodiment variant shown in FIG. 5, instead of the metal insert 9 produced from steel with the guide strip 8 received therein, the metal insert 12 is produced from bearing bronze, with the side of this metal insert 12 that faces the brake piston rod 4 bearing in operation directly against the lateral surface 41 of the brake piston rod 4.

In the embodiment variant shown here, the bearing surface of the metal insert 12 has peripheral lubricant grooves 13 which extend between bearing strips 14 remaining as support surfaces, with the bearing strips 14 bearing against the lateral surface 41 of the brake piston rod 4 in the installed state of the guide and sealing ring 3.

In the embodiment variant shown in FIG. 5, the metal insert 11 is completely enclosed by the material of the sealing lip 34.

The metal insert 11, which is here optionally also formed from steel, can thus not come into contact with the brake piston rod 4.

Figure 6:
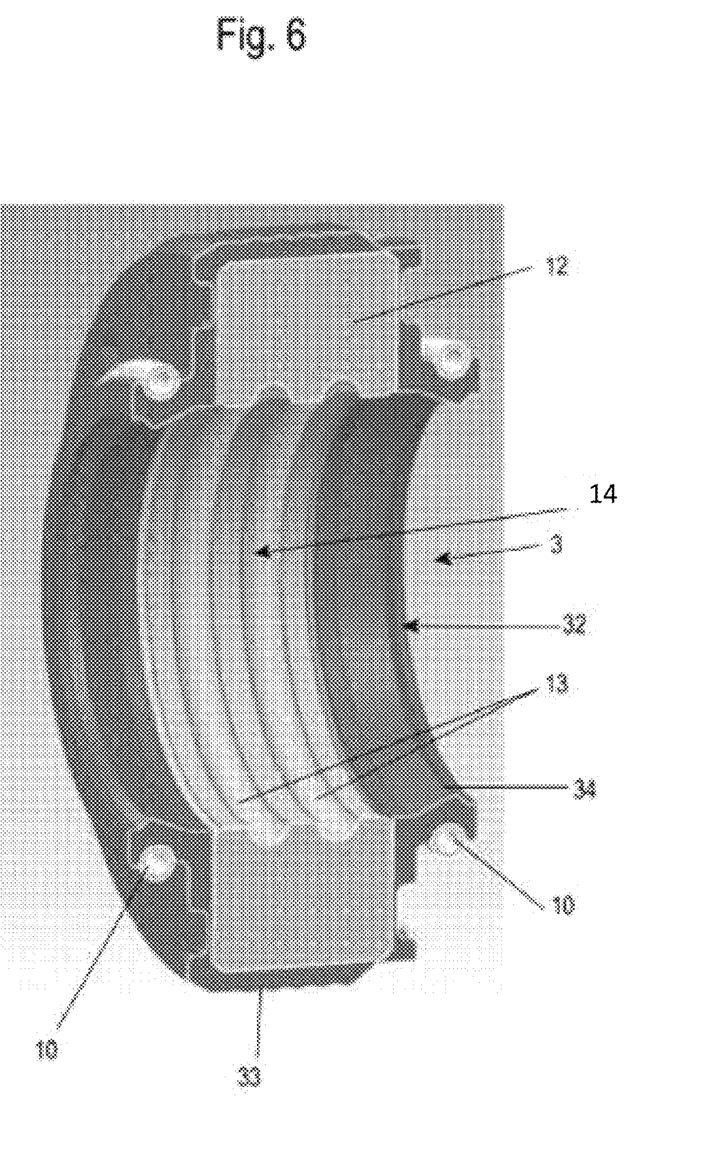
FIG. 6 shows an illustration corresponding to FIGS. 2 and 4 of a further embodiment variant of a guide and sealing ring.

In order to avoid the sealing lip 34 being detached here as a result of a material displacement upon bearing of the guide region of the material of the sealing lip 34, it is optionally also the case here that lubricant grooves 13 running around radially on the inside in front of the metal insert 11 are provided in the material of the sealing lip 34 with bearing strips 14 bearing between them against the brake piston rod 4, with the result that possibly occurring material displacements in the region of the guide region 31 extend into the lubricant grooves 13 so as to thus effectively avoid any displacement or bulging of the sealing lip 34 as seen in FIG. 6.

LIST OF REFERENCE SIGNS

- 2 Housing
- 21 Housing base
- 22 Cylinder wall
- 23 Bore
- 24 Recess
- 25 Interior
- 3 Guide and sealing ring
- 31 Guide region
- 32 Sealing region
- 33 Casing
- 34 Sealing lip
- 4 Brake piston rod
- 41 Lateral surface
- 5 Spring
- 6 Spring brake piston
- 7 Sealing ring
- 8 Guide strip
- 9 Metal insert
- 10 Tension spring
- 11 Metal insert
- 12 Metal insert
- 13 Lubricant groove
- 14 Bearing strip

The invention claimed is:

1. A pressure-medium-actuated brake cylinder of a rail vehicle, the cylinder comprising:
    a housing;
    a translationally movable brake piston rod extending through a bore in a housing base;
    a guide ring which is received in the bore and encloses the brake piston rod and guides the brake piston rod in the bore; and
    at least one sealing ring which is received in the bore, encloses the brake piston rod and seals an interior of the housing with respect to a space outside the housing,
    wherein the guide ring and the at least one sealing ring form a guide and sealing ring combined structural unit,
    wherein a guide region of the guide and sealing ring combined structural unit includes a metal insert, and
    wherein the metal insert is enclosed by material of a sealing lip on at least three sides.

2. The brake cylinder of claim 1, wherein the guide and sealing ring combined structural unit has central guide region is adjoined on both sides by sealing regions as viewed in the axial direction of the brake piston rod.

3. The brake cylinder of claim 2, wherein each of the sealing regions has a sealing lip bearing against a lateral surface of the brake piston rod.

4. The brake cylinder of claim 3, wherein a spring element is arranged on a side of each of the sealing regions that faces away from the lateral surface of the brake piston rod.

5. The brake cylinder of claim 4, wherein each spring element is a tension spring.

6. The brake cylinder of claim 3, wherein the sealing lip is made of an acrylonitrile-butadiene rubber elastomer having a glass transition temperature of below −60° C.

7. The brake cylinder of claim 1, wherein the metal insert includes, on its side facing the brake piston rod, a groove in which a guide strip made of a low-friction material is inserted.

8. The brake cylinder of claim 7, wherein the guide strip is made of polytetrafluoroethylene having a carbon content of 20% to 30%.

9. The brake cylinder of claim 7, wherein the metal insert is designed as a ring which completely encloses the guide strip radially from the outside.

10. The brake cylinder of claim 1, wherein the metal insert is made of steel.

11. The brake cylinder of claim 1, wherein the metal insert is completely enclosed by the material of the sealing lip.

12. The brake cylinder of claim 11, wherein a sliding surface which is arranged radially on the inside in front of the metal insert and consists of the material of the sealing lip has peripheral lubricant grooves.

13. The brake cylinder of claim 1, wherein an inner surface of the metal insert made of bearing bronze, bears against the brake piston rod.

14. The brake of claim 13, wherein the inner surface of the metal insert has peripheral lubricant grooves.

* * * * *